Feb. 16, 1971    D. W. EARL    3,563,070
LOCKING DEVICE FOR ATTACHMENT MEANS
Filed Jan. 10, 1969    2 Sheets-Sheet 1
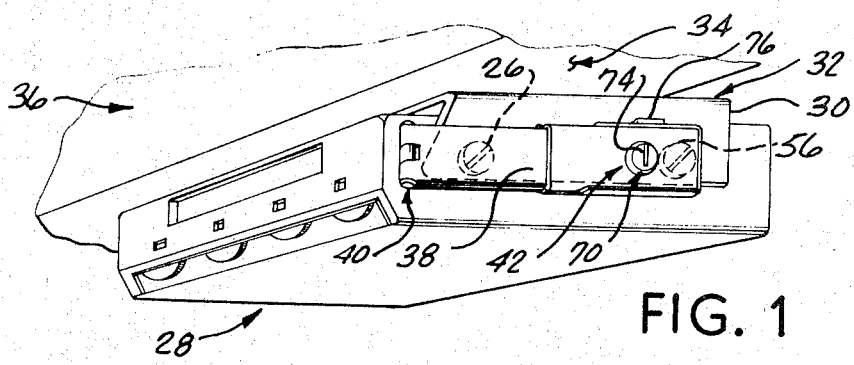
FIG. 1
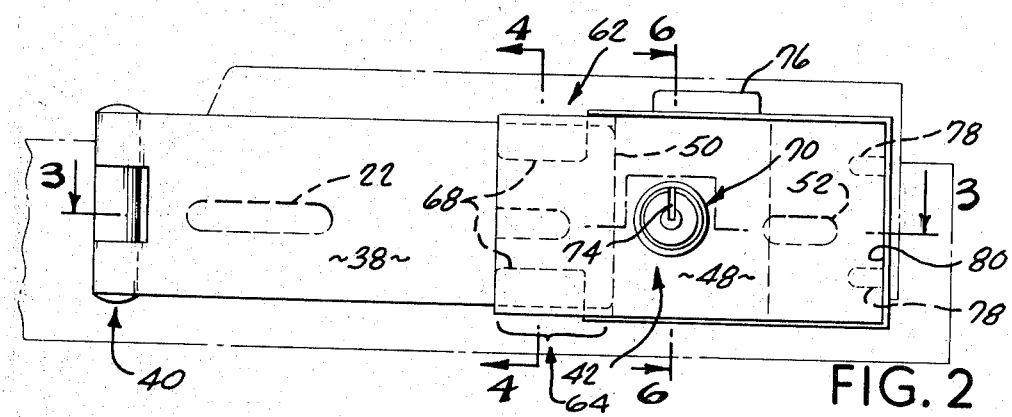
FIG. 2
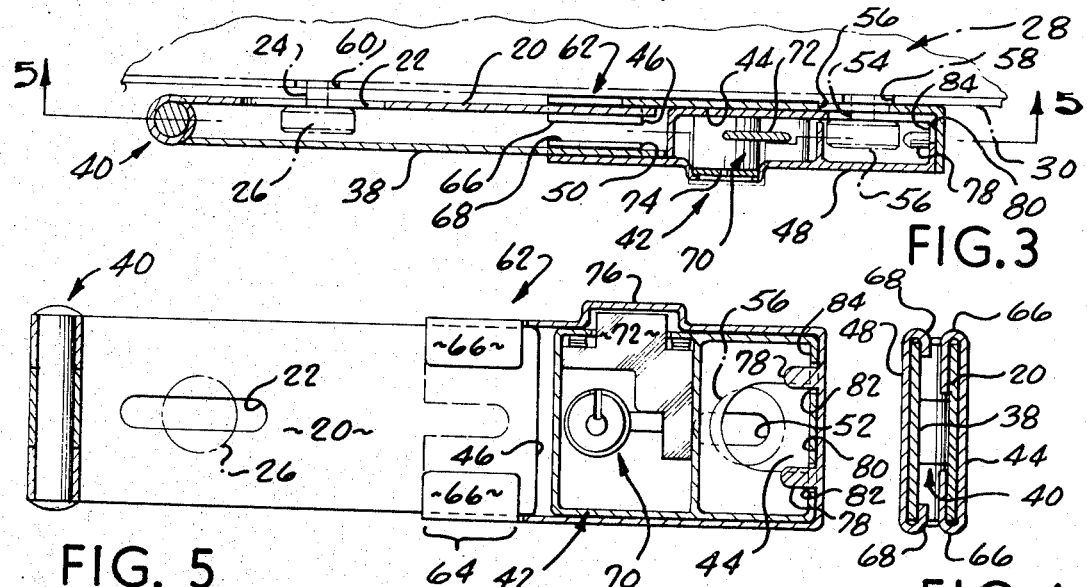
FIG. 3
FIG. 5
FIG. 4
*INVENTOR.*
DALLAS W. EARL

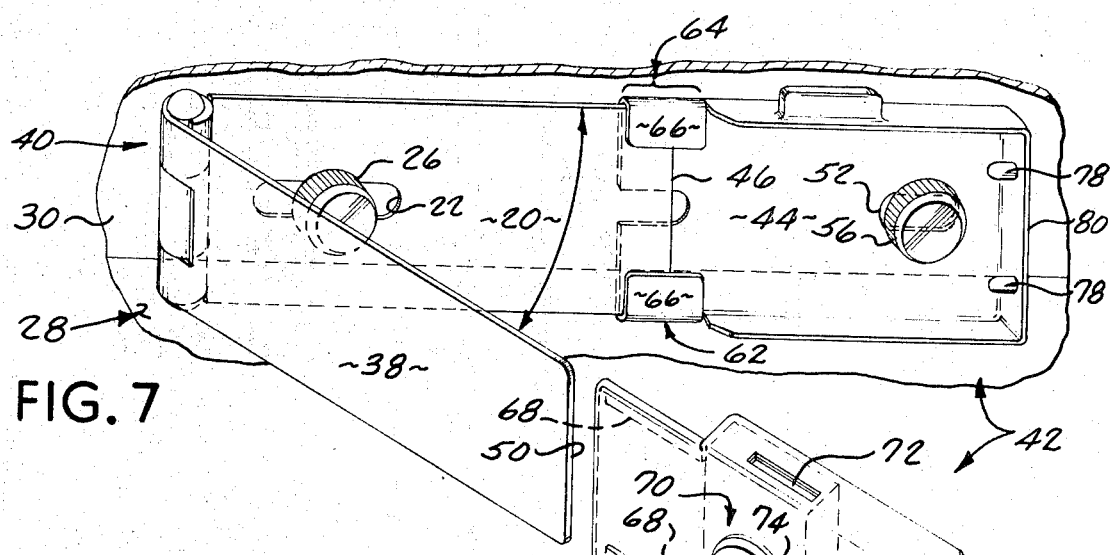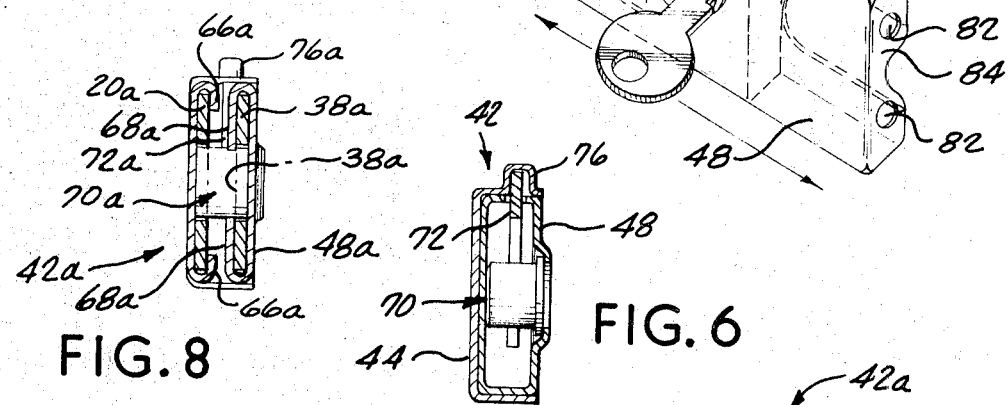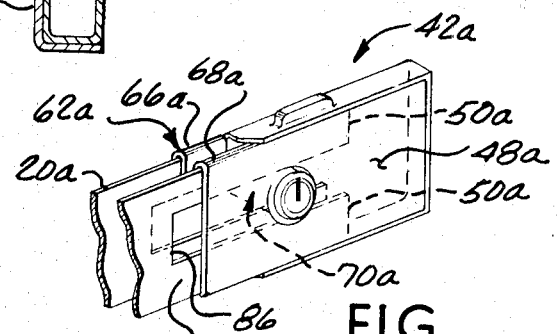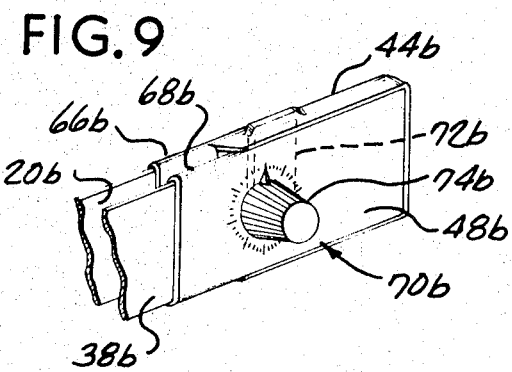

United States Patent Office 3,563,070
Patented Feb. 16, 1971

3,563,070
LOCKING DEVICE FOR ATTACHMENT MEANS
Dallas W. Earl, 3216 Laclede Ave.,
Los Angeles, Calif. 90039
Filed Jan. 10, 1969, Ser. No. 790,354
Int. Cl. E05b *73/00;* F16b *41/00*
U.S. Cl. 70—232                                         9 Claims

ABSTRACT OF THE DISCLOSURE

The specification discloses a locking device for threaded attachment means, usually adapted to attach an auxiliary supportable object, such as a tape playing transducer means, although not specifically so limited, with respect to an auxiliary mounting structure which, in certain forms, may be a mounting bracket attached underneath the instrument panel of a motor vehicle, although not specifically so limited in all forms of the invention. The locking device includes a base plate member and a cover plate member adapted to be attached to such an auxiliary supportable object and to such an auxiliary mounting structure and to effectively protect and cover such threaded attachment means so as to prevent the unauthorized disengagement thereof except when the cover plate member is moved from a protective position into an open position, which is normally prevented by locking means cooperating therewith and adapted to be normally locked but to be controllably unlockable by an authorized person in the event that the auxiliary supportable object is to be disengaged from the auxiliary mounting structure.

Generally speaking, the present invention comprises a locking device for threaded attachment means which, in one preferred form, is adapted to attach an auxiliary supportable object, which may take the form of a tape playing transducer means or the like with respect to an auxiliary mounting structure which, in one preferred form, may comprise a mounting bracket or the like, attached underneath the instrument panel of a motor vehicle, although not specifically so limited in all forms of the invention. The locking device includes a base plate member provided with connection aperture means adapted to receive therethrough threaded attachment means for attaching an auxiliary supportable object (such as a tape player unit or the like) to an auxiliary mounting structure (such as an instrument-panel-mounted bracket) with the base plate member being provided with a cover plate member and mounting means (in one preferred form, hinged mounting means) for mounting the cover plate member for movement into a protective position in effectively superimposed, covering relationship with respect to at least that portion of the base plate member carrying the connection aperture means and for movement away from said protective position into an open position providing convenient exterior access to at least that portion of the base plate member carrying the connection aperture means. The locking device also includes locking means cooperable with respect to the base plate member and the protective cover plate member for controllably locking same in said protective position and for controllably unlocking same for movement of said protective cover plate member into said open position. The locking means, in one preferred form of the invention, may comprise a rear base plate portion attached with respect to one end of the base plate member and a separate front protective locking means portion attachable with respect to one end of the protective cover plate member and lockable and unlockable with respect to the rear base plate portion of the locking means. Also, in one preferred form of the invention, the rear base plate portion of the locking means may be provided with connection aperture means in a manner similar to the previously mentioned base plate member and adapted to receive therethrough another portion of the previously mentioned threaded attachment means for supplementing the attaching of such an auxiliary supportable object (such as a tape player or the like) to such an auxiliary mounting structure (such as a dashboard-mounted-bracket or the like), with the separate front protective locking means portion being adapted, when locked with respect to the rear base plate portion of said locking means, to be in a protective position lying in effectively superimposed, covering relationship with respect to the connection aperture means carried by the rear base plate portion of said locking means. Also, in one preferred form of the invention, the connection aperture means carried by the base plate member and the connection aperture means carried by the rear base plate portion of the locking means may be effectively relatively longitudinally positionally adjustable so as to make it possible for same to cooperate with at least a pair of threaded attachment means spaced apart any distance within a predetermined range of such spacings. In one preferred exemplary form of the invention, one of the front and rear portions of the locking means is provided with rotary lock-actuating means and a corresponding extendable and retractable latch means, while the other of said front and rear portions of said locking means is provided with a corresponding latch-receiving catch means controllably relatively engageable and disengageable with respect to the latch means, and, in one preferred form, the rotary lock-actuating means is provided with exteriorly accessible lock-operating means which, in one version, takes the form of a key-engageable slot and which, in another version, takes the form of a combination lock type of actuating knob or any other substantial functional equivalent thereof, to allow controlled operation thereof in a rotary lock-actuating manner by authorized personnel only.

One preferred application of the locking device of the present invention is for locking the threaded attachment means customarily used to attach a motor vehicle tape player or stereo device to a conventional bracket fastened underneath the instrument panel or dashboard of a motor vehicle in a manner such that, after the tape player is fastened to the mounting bracket by the conventional threaded attachment means, the locking device of the present invention is moved into the protective position previously mentioned, which will cover the heads of the conventional attachment screws comprising the threaded attachment means fastening the conventional tape player to the conventional mounting bracket, in a manner such that a person will not be able to reach said screws for the purpose of removing same. Thus, it will not be possible to remove the tape player or stereo unit for the purpose of theft, as is quite often the case when no such locking device is provided.

It will readily be understood that if the owner of a motor vehicle and/or tape player or stereo unit mounted underneath the instrument panel of an automobile by being attached to a mounting bracket and then having the threaded attachment means thereof protected by the locking device of the present invention, wishes to remove the tape player or stereo unit, all that is necessary for him to do is to unlock the locking device of the present invention, in one preferred form by using the key engageable therewith, although not specifically so limited, and to then move the protective cover plate member out of superimposed relationship over the heads of the threaded attachment means so that he can unscrew the threaded attachment means, either with his fingers in the case of enlarged knurled heads, or with a screwdriver, wrench, pair of pliers, or any other suitable torque-applying tool, which will cause complete disengagement of the tape player or stereo unit from the mounting bracket so that it can be removed. The important point to note is that the removal operation can only be effected by an authorized person who has the key to the locking device in his possession or, in the event that the locking device is adapted to be unlocked by a combination-type lock, by an authorized person who knows the combination of such a combination lock. All other persons, who may be referred to as unauthorized persons, will find it impossible to detach the tape player or stereo unit from the mounting bracket which, in itself, is usually fastened to the instrument panel of the motor vehicle dashboard in a manner which is virtually incapable of being detached easily and thus the easy theft of such tape players and stereo units from motor vehicles, which has been widely prevealent in the past, will no longer be possible.

The above is the major purpose of this particular application of the locking device of the present invention, and it is described herein in connection with this particular application, and the figures of the accompanying drawing illustrate this particular application of the invention. However, it should be clearly understood that this is done for illustrative purposes only and is not to be construed as limiting the invention to this particular application and use only. Actually, the locking device of the present invention may be used wherever it is desired to prevent access to attachment means, or the like (usually threaded attachment means, although not specifically so limited), and the specific exemplary application and use of the present invention described and illustrated in detail hereinafter is to be broadly construed in the light of the foregoing statement.

With the above points in mind, it is an object of the present invention to provide a novel locking device for controlling access to a particular region or zone (usually containing attachment means of one type or another), of the character referred to herein, generically and/or specifically, which may include any or all of the features referred to herein, either individually or in combination, and which is of extremely simple, inexpensive construction suitable for ready mass manufacture with a minimum of tooling and, therefore, of capital costs, and also adapted for production at a minimum cost per unit, whereby to be conducive to widespread production, distribution, sale, and use of the invention for the purposes outlined herein, or for any other substantially functionally equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, three embodiments of the invention are specifically illustrated for exemplary purposes only in the hereinbelow-described figures of the accompanying drawings and are described in detail hereinafter.

FIG. 1 is a perspective view illustrating one exemplary embodiment of the invention in mounted, operative, protective and locked relationship with respect to a portion of an auxiliary mounting structure, comprising a mounting bracket, attached underneath the instrument panel of a motor vehicle and covering and protecting a portion of the threaded attachment means employed for attaching an auxiliary supportable object, taking the form of a tape player unit, to said mounting bracket in a manner such that the threaded attachment means having their head ends covered and protected by the locking device, are completely inaccessible and cannot be disengaged, thus positively preventing the removal of the tape playing unit from the mounting bracket by an unauthorized person.

FIG. 2 is an enlarged side elevational view of FIG. 1.

FIG. 3 is a sectional view taken substantially on the plane indicated by the arrows 3—3 of FIG. 2.

FIG. 4 is a fragmentary, sectional view taken substantially along the plane and in the direction indicated by the arrows 4—4 of FIG. 2.

FIG. 5 is a fragmentary view taken substantially along the plane and in the direction indicated by the arrows 5—5 of FIG. 3.

FIG. 6 is a fragmentary view, partially in section and partially in elevation, and of a somewhat diagrammatic and incomplete nature, taken substantially along the plane and in the direction indicated by the arrows 6—6 of FIG. 2.

FIG. 7 is a view showing the front portion of the locking means unlocked, disengaged, and separated from the rear portion thereof and also showing the front protective cover plate member moved from the protective position into the open position to allow free access to the heads of the threaded attachment means fastening the rear base plate member to the instrument panel bracket and to the tape player unit so that said threaded attachment means can be disengaged to allow the tape player unit to be removed from the mounting bracket.

FIG. 8 is a fragmentary view similar in many respects to FIG. 4, taken in a direction similar to that of FIG. 6, but illustrates a slight modification of the invention.

FIG. 8A is a fragmentary, perspective view of the modified form of the invention illustrated in FIG. 8 in cross section.

FIG. 9 is a fragmentary, perspective view of a slightly modified form of the invention wherein a different type of operating means for the rotary lock-actuating structure or means is provided than that disclosed in the first form of the invention illustrated in FIGS. 1–7 inclusive.

Generally speaking, the examplary first form of the invention comprises a base plate member 20 provided with connection aperture means 22 adapted to receive therethrough threaded attachment means, such as the threaded screw 24 having the enlarged knurled and slotted head 26 at the outer end thereof, for attaching an auxiliary supportable object, such as the tape player or stereo unit indicated generally at 28, to an auxiliary mounting structure, such as one side flange 30 of the mounting bracket, indicated generally at 32, which is firmly attached at its top to the underneath surface of an instrument panel, such as is indicated generally at 34, of a motor vehicle, such as is indicated fragmentarily and generally at 36.

The base plate member 20 is provided with a cover plate member 38 and mounting means for mounting same for movement into a protective position in effectively superimposed, covering relationship with respect to at least that portion of the base plate member 20 carrying the connection aperture means 22 and for movement away from said protective position into an open position providing convenient exterior access to at least that portion of the base plate member 20 carrying said connection aperture means 22. In the example illustrated, said mounting means mounting said cover plate member 38 is generally designated by the reference numeral 40 and comprises hinged mounting means adapted to allow said cover plate member 38 to be pivotally or hingedly swung into the above-mentioned closed, protective position such as is shown in FIGS. 1 through 6, inclusive, and when unlocked in the manner described hereinafter, to allow said cover plate member 38 to be pivotally or hingedly swung into an open position, such as is clearly shown in FIG. 7.

Normally, the protective cover plate member 38 is adapted to be locked in the protective position shown in FIGS. 1–6 inclusive by locking means, such as is indicated generally by the reference numeral 42, which is cooperable with respect to both the base plate member 20 and the protective cover plate member 38 for controllably locking them in the closed relationship shown in FIGS. 1–6 inclusive and for controllably unlocking them to allow movement of the protective cover plate member 38 toward and into open position, such as is clearly shown in FIG. 7. This latter unlocking of the locking means 42 and the pivotal or hinged movement of the protective cover plate member 38 into the open position shown in FIG. 7 does not normally occur very often—only when an authorized person wishes to unscrew the threaded attachment means 24 so that the tape player or stereo unit 28 can be completely detached and removed from the mounting bracket 32. This would normally occur only when the tape player unit 28 is being removed for replacement or repair or for mounting on another vehicle or the like. Normally, the locking device of the present invention will be in the protective position shown in FIGS. 1–6, inclusive, with the locking means 42 maintaining it in said protective position and positively preventing access by any unauthorized person to the heads 26 of the threaded attachment means 24 positioned immediately behind the protective cover plate member 38 and thus positively preventing the theft of the tape player or stereo unit 28.

In the exemplary first form of the invention illustrated, the locking means 42 comprises a rear base plate portion 44 attachable with respect to one free end 46 of the base plate member 20 and also comprises a separate front protective locking means portion 48 similarly attachable with respect to a similar corresponding free end 50 of the protective cover plate member 38 and lockable and unlockable with respect to the rear base plate portion 44 of the locking means 42 in the manner shown in FIGS. 1–6 inclusive so as to positively hold the protective cover plate member 38 in protective, covering relationship, superimposed over the heads 26 of the threaded attachment means 24 in a manner preventing exterior access thereto by an unauthorized person.

In the exemplary first form of the invention illustrated in FIGS. 1–7, said rear base plate portion 44 is provided with connection aperture means 52 adapted to receive therethrough another portion of a threaded attachment means 54, such as a threaded screw having an outwardly or frontally positioned head portion 56, which is normally exteriorly accessible when the front portion 48 of the locking means 42 is unlocked from the rear base plate portion 44 thereof and is separated therefrom in the manner best illustrated in FIG. 7. However, it should be clearly noted that, normally, when the device is in the locked, protective relationship shown in FIGS. 1–6 inclusive, the front locking means portion 48 is locked to the rear base plate portion 44 of the locking means 42 and, thus, is effectively locked in a protective, superimposed, covering relationship with respect to the connection aperture means 52 and the head 56 of the screw type threaded attachment means 54 so that an unauthorized person cannot gain access thereto for the purpose of unscrewing the threaded attachment means 56 which passes through a corresponding hole 58 in the side portion 30 of the bracket 32 and then into the tape player or stereo unit 28 for positively fastening said structures together in a theft-proof manner.

It should, of course, be noted that the previously mentioned screw-type threaded attachment means 24 also has its head 26 positioned frontally or outwardly with respect to the previously mentioned connection aperture means 22 carried by the base plate member 20, and said threaded attachment means 24 extends through a similar hole 60 in the side portion 30 of the bracket 32 and then extends into threaded engagement with the tape player or stereo unit 28 in a manner similar to that just described in connection with the threaded attachment means 54 and, of course, the corresponding head 26 of said threaded attachment means 24 is covered by the protective cover plate member 38 at the same time that the locked front portion 48 of the locking means 42 covers the head 56 of the other threaded attachment means 54. This fully locked, protective relationship is clearly shown in various orientations in all of FIGS. 1 through 6, inclusive.

It should be noted that there are various different makes of tape players and stereo units on the market and various different configurations and sizes of mounting brackets carried underneath the motor vehicle instrument panel, and certain of these may require different spacings between the two different threaded attachment means 24 and 54, and in the preferred form of the invention illustrated in FIGS. 1–7, inclusive, means is provided for making the locking device of the present invention adaptable to all such variable spacing arrangements. This is normally provided by connecting the rear base plate portion 44 of the locking means 42 with respect to the base plate member 20 for relative longitudinal movement in any of a variety of different ways so that the two corresponding connection aperture means 52 and 22 can be relatively longitudinally shifted and positionally adjusted to a desired spacing dictated by the corresponding variations in a tape player or stereo unit and/or corresponding variations in a mounting bracket and the mounting holes 58 and 60 thereof. Also, smaller scale positional adjustments can be effected by reason of the fact that, in the exemplary first form of the invention, each of the two connection apertures 22 and 52 takes the form of a slot means elongated to a length direction of the base plate member 22 and of the rear base plate portion 44 of the locking means 42.

In the exemplary first form of the invention illustrated, the above generically mentioned means for making it possible to longitudinally shift the two connection apertures 22 and 52 with respect to each other, takes the form of controllably operable length-adjustment means, such as is generally designated by the reference numeral 62, effectively positioned at an attachment region, indicated by the bracket 64, where the previously mentioned free end 46 of the base plate member 20 is attached with respect to the rear base plate portion 44 of the locking means. Said controllably operable length-adjustment means 62, in the exemplary first form of the invention illustrated, may also be said to be effectively positioned at said attachment region 64, where the previously mentioned free end 50 of the cover plate member is attachable with respect to the front portion 48 of the locking means 42.

In the exemplary first form of the invention illustrated, said controllably operable length-adjustment means 62 is of a telescopic nature and comprises a pair of forwardly curved channel-defining edge portions 66 carried by the rear base plate portion 44 of the locking means 42 and so shaped and positioned as to slidably longitudinally telescopically receive therein the attachable free end portion 46 of the base plate member 20 in a manner which allows relative longitudinal slidable adjustment of the base plate member 20 and the rear base plate portion 44 of the locking means 42 so as to correspondingly vary the longitudinal spacing between the two connection aperture means 22 and 52. The front portion of said controllably operable length-adjustment means 62 is of similar construction and comprises a pair of rearwardly curved channel-defining edge portions 68 carried by the front portion 48 of the locking means 42 and so shaped as to define a longitudinal receiving channel adapted to longitudinally slidably receive therein the corresponding attachable free end 50 of the previously mentioned protective cover plate member 38 so as to allow corresponding relative longitudinal movement between the protective cover plate member 38 and the front portion 48 of the locking means 42 in a manner exactly corresponding to the previously mentioned relative longitudinal movement between the base plate member 20 and the rear base plate portion 44 of the locking means 42.

In the exemplary first form of the invention illustrated, the previously mentioned controllably lockable front and rear portions 48 and 44 of the locking means 42 are provided with lock-actuating means (usually taking the form of a rotary lock tumbler structure of a conventional or well-known type) such as is generally designated by the reference numeral 70, which drivingly cooperates with a corresponding extendable and retractable latch means 72 and which also has an exteriorly accessible operating means which, in the exemplary first form of the invention, takes the form of a key-engageable slot 74 adapted to receive a key which will be capable of rotating the lock-actuating means 70 in a manner which will either extend or retract the latch means 72 in correspondence with the direction of rotation of such a key inserted within the key slot 74.

The other one of said separable but controllably lockable front and rear portions 48 and 44 of the locking means 42 from the one carrying the lock-actuating means 70 is provided with a corresponding latch-receiving catch means 76 positioned in a manner such as to be capable of receiving and engaging the previously mentioned latch means 72 when it is extended as a result of insertion of a key in the key slot 74 and rotation of the key in a locking direction. Of course, rotation of such a key in an opposite unlocking direction will retract the latch means 72 from the catch means 76 so that they will become completely disengaged.

In aid in imparting rigidity to the locking means 42 when fully locked, a pair of engaging pins 78 are carried by an end wall 80 of the rear base plate portion 44 of the locking means 42, and a pair of corresponding pin-receiving holes 82 are carried by an end wall 84 of the locking means front portion 48 so that said pin-receiving holes 82 can be slipped onto the pins 78 prior to operating the lock-actuating means 70 so as to cause the extension of the latch means 72 into the catch means 76 for locking the front portion 48 of the locking means 42 rigidly to the rear base plate portion 44 of the locking means 42 in the manner clearly illustrated in FIGS. 1–6, inclusive.

Of course, it should be understood that the above-described type of specific locking structure is exemplary only and is not to be construed as limiting the invention specifically thereto, since many other types of locking means may be used within the broad scope and teachings of the present invention.

FIGS. 8 and 8A illustrate a slight modification of the invention, and because it is a modification, parts which are substatnially structurally or functionally identical to or similar to those of the first form of the invention are designated by similar reference numerals, followed by the letter a, however. In this modification, it should be noted that the front portion 48a of the locking means 42a has the channel-defining portions 68a modified somewhat from the corresponding channel-defining portions 68 of the first form of the invention and so arranged in this modification as to allow a greater extent of relative longitudinal movement of the protective cover plate member 38a with respect to the front portion 48a of the locking means 42a. This is made possible, in the exemplary form illustrated in FIGS. 8 and 8A, by positioning the channel-defining portions 68a so as to by-pass on each side the rotary lock-actuating means 70a and by having the corresponding free attachable end 50a of the protective cover plate 38a split or bifurcated so as to have an opening 86 therein of a width such as to allow the bifurcated end portions 50a on each side thereof to extend beyond and not be stopped by the lock-actuating means 70a.

In connection with the above extended form of the length-adjustment means 62a disclosed in the FIGS. 8 and 8A modification of the invention, it should be noted that, in the first form of the invention illustrated in FIGS. 1–7, inclusive, if a major modification of the location of the two connection aperture means 22 and 52 is required and is beyond the scope permitted by the length-adjustment means 62 of the first form of the invention, particularly in a space-decreasing direction, this can be accomplished in the first form of the invention by merely shortening the protective cover plate member 38 by cutting off a portion of the free end 50 thereof. However, it will be noted that this is not necessary in the FIGS. 8 and 8A modification of the invention, which will allow a maximum operation of the length-adjustment means 62a. Incidentally, it should be noted that FIGS. 8 and 8A merely represent one of many different forms which the modified length-adjustment means may take for the purpose of extending the scope of its operation, and all such are intended to be included and comprehended within the scope of the present invention.

FIG. 9 fragmentarily illustrates a further modification of the invention, and because it is a modification, parts which are substantially structurally or functionally equivalent or similar to corresponding parts of the first form of the invention are designated by the same reference numerals, followed by the letter b, however. In the FIG. 9 modification of the invention, it will be noted that the rotary lock-actuating means, generally designated by the reference numeral 70b, is still quite similar to the corresponding structure of the first form of the invention indicated at 70, but in the FIG. 9 modification, it does not have a key-engageable slot similar to that shown at 74 in the first form of the invention. In other words, the exteriorly accessible operating means of this modification of the invention is of a different type from that illustrated in the first form of the invention and comprises an exterior operating knob or finger-engageable member 74b, which operates interior mechanism of the combination lock type and which, upon operation in the proper manner in correspondence with the correct combination of the lock, will cause rotary actuation of the lock-actuating means 70b and consequently will cause corresponding extension or retraction of the latch means 72b. This is merely representative of one of the many possible forms which the locking means may take, all within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A locking device for attachment means adapted to attach an auxiliary supportable object with respect to an auxiliary mounting structure, comprising a base plate member provided with connection aperture means adapted to receive therethrough attachment means for attaching an auxiliary supportable object to an auxiliary mounting structure, said base plate member being provided with a cover plate member and mounting means for mounting same for movement into a protective position in effectively superimposed covering relationship with respect to at least that portion of said base plate member carrying said connection aperture means and for movement away from said protective position into an open position providing convenient exterior access to at least that portion of said base plate member carrying said connection aperture means; and locking means cooperable for controllably locking said protective cover plate member in said protective position with respect to said base plate member and for controllably unlocking said protective cover plate member from said protective position to allow movement of said protective cover plate member toward and into said open position thereof, said locking means comprising a rear base plate portion attachable with respect to one end of said base plate member and a separate front locking means portion attachable with respect to one end of said protective cover plate member and lockable and unlockable with respect to said rear base plate portion of said locking means.

2. A locking device as defined in claim 1, wherein said rear base plate portion of said locking means is provided with connection aperture means adapted to receive therethrough another portion of such attachment means for supplementing the attaching of such an auxiliary supportable object to such an auxiliary mounting structure, said front locking means portion, when locked with respect to said rear base plate portion of said locking means, being in a protective position in effectively superimposed, covering relationship with respect to at least that part of said rear base plate portion of said locking means carrying said connection aperture means and being removable from said protective position when said separate front locking means portion is unlocked from said rear base plate portion of said locking means.

3. A locking device as defined in claim 1, including controllably operable length-adjustment means effectively positioned at an attachment region where said attachable end of said base plate member is attachable with respect to said rear base plate portion of said locking means.

4. A locking device as defined in claim 1, including controllably operable length-adjustment means effectively positioned at an attachment region where said attachable end of said base plate member is attachable with respect to said rear base plate portion of said locking means, said controllably operable length-adjustment means being also effectively positioned at an attachment region where said attachable end of said cover plate member is attachable with respect to said front portion of said locking means.

5. A locking device as defined in claim 1, wherein said connection aperture means comprises slot means elongated in a length direction of said base plate member and said locking means.

6. A locking device as defined in claim 1, wherein one of said separable but controllably lockable front and rear portions of said locking means is provided with a lock-actuating means and a corresponding extendable and retractable latch means, while the other of said front and rear portions of said locking means is provided with a corresponding latch-receiving catch means controllably relatively engageable and disengageable with respect to said latch means.

7. A locking device as defined in claim 6, wherein said lock-actuating means is provided with an exteriorly accessible operating means for controlled operation thereof by authorized personnel only.

8. A locking device as defined in claim 6, wherein said lock-actuating means is provided with an exteriorly accessible operating means taking the form of a key-engageable slot for controlled operation thereof by authorized personnel only.

9. A locking device as defined in claim 6, wherein said lock-actuating means is provided with an exteriorly accessible operating means taking the form of a combination lock type operating member for controlled operation thereof by authorized personnel only.

References Cited

UNITED STATES PATENTS

| | | | |
|---|---|---|---|
| 2,315,245 | 3/1943 | Collier | 70—232 |
| 3,410,122 | 11/1968 | Moses | 70—232X |
| 3,434,312 | 3/1969 | Buchman | 70—232X |

MARVIN A. CHAMPION, Primary Examiner

A. G. CRAIG, JR., Assistant Examiner

U.S. Cl. X.R.

70—11, 58, 461